US012700540B2

(12) United States Patent
Yamashita et al.

(10) Patent No.: US 12,700,540 B2
(45) Date of Patent: Aug. 4, 2026

(54) MULTILAYER CERAMIC ELECTRONIC COMPONENT

(71) Applicant: TDK CORPORATION, Tokyo (JP)

(72) Inventors: Yasuhide Yamashita, Tokyo (JP); Kotaro Terao, Tokyo (JP)

(73) Assignee: TDK CORPORATION, Tokyo (JP)

( * ) Notice: Subject to any disclaimer, the term of this patent is extended or adjusted under 35 U.S.C. 154(b) by 183 days.

(21) Appl. No.: 18/840,124

(22) PCT Filed: Aug. 31, 2022

(86) PCT No.: PCT/JP2022/032829
§ 371 (c)(1),
(2) Date: Aug. 21, 2024

(87) PCT Pub. No.: WO2023/162297
PCT Pub. Date: Aug. 31, 2023

(65) Prior Publication Data
US 2025/0182967 A1      Jun. 5, 2025

(30) Foreign Application Priority Data
Feb. 22, 2022     (JP) ................................. 2022-025859

(51) Int. Cl.
*H01G 4/008*      (2006.01)
*H01G 4/30*       (2006.01)

(52) U.S. Cl.
CPC ............. *H01G 4/0085* (2013.01); *H01G 4/30* (2013.01)

(58) Field of Classification Search
CPC .......... H01G 4/30; H01G 4/008; H01G 4/005; H01G 4/0085

USPC .................................... 361/321.1, 301.4, 303
See application file for complete search history.

(56) References Cited

U.S. PATENT DOCUMENTS

| | | | |
|---|---|---|---|
| 2018/0336998 A1* | 11/2018 | Kitamura ............... | H01G 4/012 |
| 2019/0051459 A1* | 2/2019 | Mizuno ................ | H01G 4/1227 |
| 2019/0244757 A1* | 8/2019 | Kwon ................... | C01G 23/003 |
| 2022/0208471 A1* | 6/2022 | Song ..................... | H01G 4/008 |

FOREIGN PATENT DOCUMENTS

| | | |
|---|---|---|
| JP | 2001-110233 A | 4/2001 |
| JP | 2007-039755 A | 2/2007 |

OTHER PUBLICATIONS

Aug. 27, 2024 International Preliminary Report on Patentability issued in International Patent Application No. PCT/JP2022/032829.

* cited by examiner

*Primary Examiner* — Arun Ramaswamy
(74) *Attorney, Agent, or Firm* — Oliff PLC

(57)           ABSTRACT

An internal electrode layer includes therein a plurality of inner ceramic particles within an observation range of a cross-section intersecting the internal electrode layer. The position of the inner ceramic particles in the internal electrode layer relative to the center position of the internal electrode layer in the thickness direction is correlated with the position from the center position to the edge position, and the corresponding positions are indicated by the numbers 0-100. Such an index is referred to as Dsp. Inside the internal electrode layer, within a region of Dsp of 40 or less, preferably 30 or less, the inner ceramic particles are present in an area of at least 50% of the total area of the inner ceramic particles present within the observation range.

8 Claims, 9 Drawing Sheets

MULTILAYER CERAMIC ELECTRONIC COMPONENT

TECHNICAL FIELD

The present invention relates to a multilayer ceramic electronic component including ceramic layers and internal electrode layers alternately stacked.

BACKGROUND ART

In a multilayer ceramic capacitor as an example of a multilayer ceramic electronic component, it is effective to thin internal electrode layers as internal conductor films so as to achieve higher capacitance and smaller size. In many cases, the internal electrode layers are formed through a step of simultaneously firing a conductor paste film containing conductive metal particles such as nickel particles, an organic solvent, and an organic binder with a dielectric ceramic sheet.

In the above-mentioned firing step, there is normally a difference in shrinkage behavior during sintering between a metal component contained in the conductor paste film and a ceramic component contained in the dielectric ceramic sheet. More specifically, the sintering temperature of the ceramic component is 1000° C. or more, whereas the sintering temperature of the metal component, such as nickel, is lower than 1000° C. and is, for example, 600 to 800° C.

When the internal electrodes are thinned, the difference in shrinkage behavior during sintering between the metal component contained in the conductor paste film and the ceramic component contained in the dielectric ceramic sheet leads to problems such as gaps in the internal electrode layers. That is, in the sintering process, the metal component starts to sinter before the ceramic component, and the grain growth of the metal component proceeds excessively by the time the ceramic component reaches the temperature at which the ceramic component starts sintering, resulting in a decrease in the continuity of the internal electrode layers. The decrease in the continuity of the internal electrode layers leads to a decrease in the capacitance of the multilayer ceramic capacitor.

To solve the above-mentioned problems, a method is employed in which ceramic particles referred to as an inhibitor are added to the conductor paste for forming the internal electrodes so as to reduce sintering of the metal component. In accordance with the recent trend toward the thinning of internal conductor films, it is desirable for the inhibitor to have a particle size of 100 nm or less (see, for example, Patent Document 1).

However, the finer the ceramic particles used in the inhibitor, the more pronounced the aggregation of the ceramic particles. Thus, in the case of a conductor paste produced by applying a batch mixing and dispersion process, when the ceramic particles contained therein are finely divided to, for example, 100 nm or less, it is difficult to uniformly arrange the fine ceramic particles around the conductive metal particles in the conductor paste due to the aggregation of the ceramic particles.

In this way, if the fine ceramic particles cannot be uniformly arranged around the conductive metal particles, the conductive metal particles sinter from areas where no ceramic particles are present, making it difficult to achieve thinning and high continuity of the internal electrode layers formed using the conductor paste.

PRIOR ARTS

Patent Document

Patent Document 1: JP2001110233 (A)

SUMMARY OF INVENTION

Problems to be Solved by Invention

The present invention has been made in view of the above circumstances. It is an object of the invention to provide a multilayer ceramic electronic component including internal electrode layers capable of achieving thin layers and high continuity.

Means for Solving the Problem

The present inventors have conducted extensive research into multilayer ceramic electronic components including internal electrode layers capable of achieving thin layers and high continuity. As a result, the present inventors have discovered that the object of the present invention can be achieved by dispersing and concentrating comparatively small ceramic particles near the center in the thickness direction of the internal electrode layers and have thus completed the present invention.

That is, a multilayer ceramic electronic component according to a first aspect of the present invention is a multilayer ceramic electronic component comprising ceramic layers and internal electrode layers alternately stacked, wherein the internal electrode layers contain a plurality of inner ceramic particles therein within an observation range of a cross section intersecting the internal electrode layers, and the inner ceramic particles are present in 50% or more of a total area of the inner ceramic particles present within a region with a Dsp of 40 or less, preferably 30 or less, inside the internal electrode layers, where Dsp is an index indicating a relative position of the inner ceramic particles in the inner electrode layers with respect to a central position in a thickness direction of the inner electrode layers, the index being expressed by a number from 0 to 100, each number corresponding to a position from the central position to an edge position.

In the first aspect of the present invention, the inner ceramic particles are present in 50% or more of a total area of the inner ceramic particles present within a region with a Dsp of 40 or less, preferably 30 or less, inside the internal electrode layers. That is, half or more (50% or more by area) of the inner ceramic particles present in the observation range are present within a region with a Dsp of 40 or less, preferably 30 or less (near the center in the thickness direction). The present inventors have confirmed that it is possible to satisfy the thinning and high continuity of the internal electrode layers at the same time in the multilayer ceramic electronic component including the internal electrode layers having such a configuration. Moreover, it is confirmed that at the same time as the thinning of the internal electrode layers, the thinning of the ceramic layers (e.g., dielectric layers) laminated so as to be sandwiched between a pair of internal electrode layers are also achieved, and that the variation in the thickness of these layers is also reduced.

A multilayer ceramic electronic component according to a second aspect of the present invention is a multilayer ceramic electronic component comprising ceramic layers and internal electrode layers alternately stacked, wherein
    the internal electrode layers contain a plurality of inner ceramic particles therein within an observation range of a cross section intersecting with the internal electrode layers, and
    the inner ceramic particles are present in 99% or more of a total area of the inner ceramic particles present within a region with a Dsp of 75 or less, preferably 73 or less, inside the internal electrode layers, where
    Dsp is an index indicating a relative position of the inner ceramic particles in the inner electrode layers with respect to a central position in a thickness direction of the inner electrode layers, the index being expressed by a number from 0 to 100, each number corresponding to a position from the central position to an edge position.

In the second aspect of the present invention, the inner ceramic particles are present in 99% or more of a total area of the inner ceramic particles present within a region with a Dsp of 75 or less, preferably 73 or less, inside the internal electrode layers. That is, most (99% or more by area) of the inner ceramic particles present in the observation range are present within a region with a Dsp of 75 or less, preferably 73 or less. The present inventors have confirmed that it is possible to satisfy the thinning and high continuity of the internal electrode layers at the same time in the multilayer ceramic electronic component including the internal electrode layers having such a configuration. Moreover, it is confirmed that at the same time as the thinning of the internal electrode layers, the thinning of the ceramic layers (e.g., dielectric layers) laminated so as to be sandwiched between a pair of internal electrode layers are also achieved, and that the variation in the thickness of these layers is also reduced.

Preferably, a ratio of the total area of the inner ceramic particles to a total area of the internal electrode layers present within the observation range is 2.5% or less, more preferably 2% or less. According to the multilayer ceramic capacitor including the internal electrode layers configured in such a manner, the coverage of the internal electrode layers with respect to the ceramic layers is improved, and the continuity of the internal electrode layers is further improved.

Preferably, the inner ceramic particles present within the observation range have a maximum particle size of 69 nm or less, more preferably 63 nm or less. The fact that the maximum particle size of the inner ceramic particles is a predetermined value or less indicates that aggregation of inhibitor particles (e.g., ceramic particles before firing) having fine particle sizes in an internal-electrode-layer paste film is reduced. As a result of firing the internal-electrode-layer paste film while the aggregation of the inhibitor particles is reduced, abnormal grain growth of the conductive particles in the paste film is reduced. This contributes to the thinning and thickness uniformity of the internal electrode layers and further improves the continuity of the internal electrode layers.

Preferably, the number of inner ceramic particles per 50 $\mu m^2$ area of the internal electrode layers present in the observation range is 185 or less, more preferably 170 or less, and is in the range of, for example, 55 to 166. When the number of inner ceramic particles is controlled, the internal electrode layers are thinned, the coverage of the internal electrode layers with respect to the ceramic layers is improved, and the continuity of the internal electrode layers is further improved.

DESCRIPTION OF EMBODIMENTS

Figure 1:
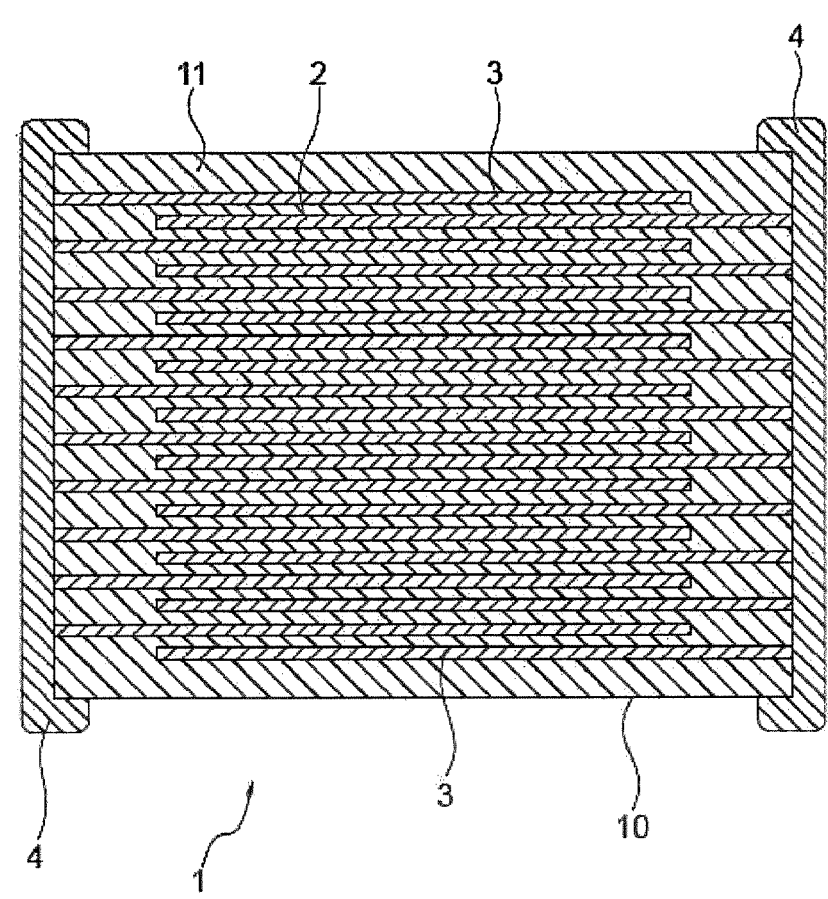
FIG. 1 is a cross-sectional view of a multilayer ceramic capacitor according to an embodiment of the present invention.
Figure 1:
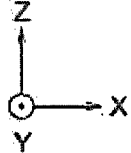

Hereinafter, the present invention is described based on an embodiment shown in the drawings.

As an example of a multilayer ceramic electronic component, a multilayer ceramic capacitor 1 according to the present embodiment is described. As shown in FIG. 1, the multilayer ceramic capacitor 1 includes ceramic layers 2 and internal electrode layers 3 substantially parallel to a plane including the X-axis and the Y-axis and includes a ceramic body 10 in which the ceramic layers 2 and the internal electrode layers 3 are alternately stacked along the Z-axis direction.

Here, "substantially parallel" means that most of the portions are parallel, but there may be some portions that are not parallel, and the ceramic layers 2 and the internal electrode layers 3 may be slightly uneven or inclined.

The internal electrode layers 3 are stacked so that their ends are alternately exposed on two end surfaces located opposite to each other along the ceramic body 10 in the X-axis. A pair of external electrodes 4 is formed on both end surfaces of the ceramic body 10 in the X-axis and is connected to exposed ends of the internal electrode layers 3 arranged alternately to form a capacitor circuit.

The conductive material for the external electrodes contained in the external electrodes 4 is not limited and, in the present embodiment, Ni and Cu, which are inexpensive, and alloys thereof can be used. The thickness of each external electrode 4 is appropriately determined depending on the application, etc., but is normally 10 to 50 $\mu m$.

The thickness of each ceramic layer 2 is not limited, but is preferably 2 $\mu m$ or less per layer, more preferably 1.5 $\mu m$ or less, even more preferably 0.8 $\mu m$ or less, and particularly preferably 0.5 $\mu m$ or less. The variation $\sigma$ in the thicknesses of the ceramic layers 2 is preferably within 0.1 μm, more preferably within 0.063 μm, and particularly preferably within 0.05 μm.

The thickness of each internal electrode layer 3 is not limited, but is preferably 2 μm or less per layer, more preferably 1.0 μm or less, even more preferably 0.5 μm or less, and particularly preferably 0.5 μm or less. The lower limit of the thickness of each internal electrode layer 3 is preferably 0.298 μm or more, and more preferably larger than 0.4 μm. The variation σ in the thicknesses of the internal electrode layers 3 is preferably within 0.3 μm, more preferably within 0.23 μm, and particularly preferably within 0.1 μm.

The lamination number of ceramic layers 2 (internal electrode layers 3) is not limited, but is preferably 20 or more, more preferably 50 or more.

The material of the ceramic layers 2 can be, for example, a dielectric ceramic composed of a main component, such as $BaTiO_3$, $CaTiO_3$, $SrTiO_3$, $CaZrO_3$, $(K_{1-x}Na_x)Sr_2Nb_5O_{15}$, $Ba_3TiNb_4O_{15}$, and $(Ba_{1-x}Ca_x)(Ti_{1-y}Zr_y)O_3$. Moreover, subcomponents, such as Mn compounds, Mg compounds, Cr compounds, Co compounds, Ni compounds, rare earth elements, Si compounds, and Li compounds, may be added to the main component.

The conductive component contained in the internal electrode layers 3 according to the present embodiment is not limited and is, for example, nickel, nickel alloy, copper, copper alloy, silver, and silver alloy, but is preferably nickel or a nickel alloy. The internal electrode layers 3 may contain various trace components, such as C, S, N, and O, in an amount of about 1 mass % or less.

Figure 2:
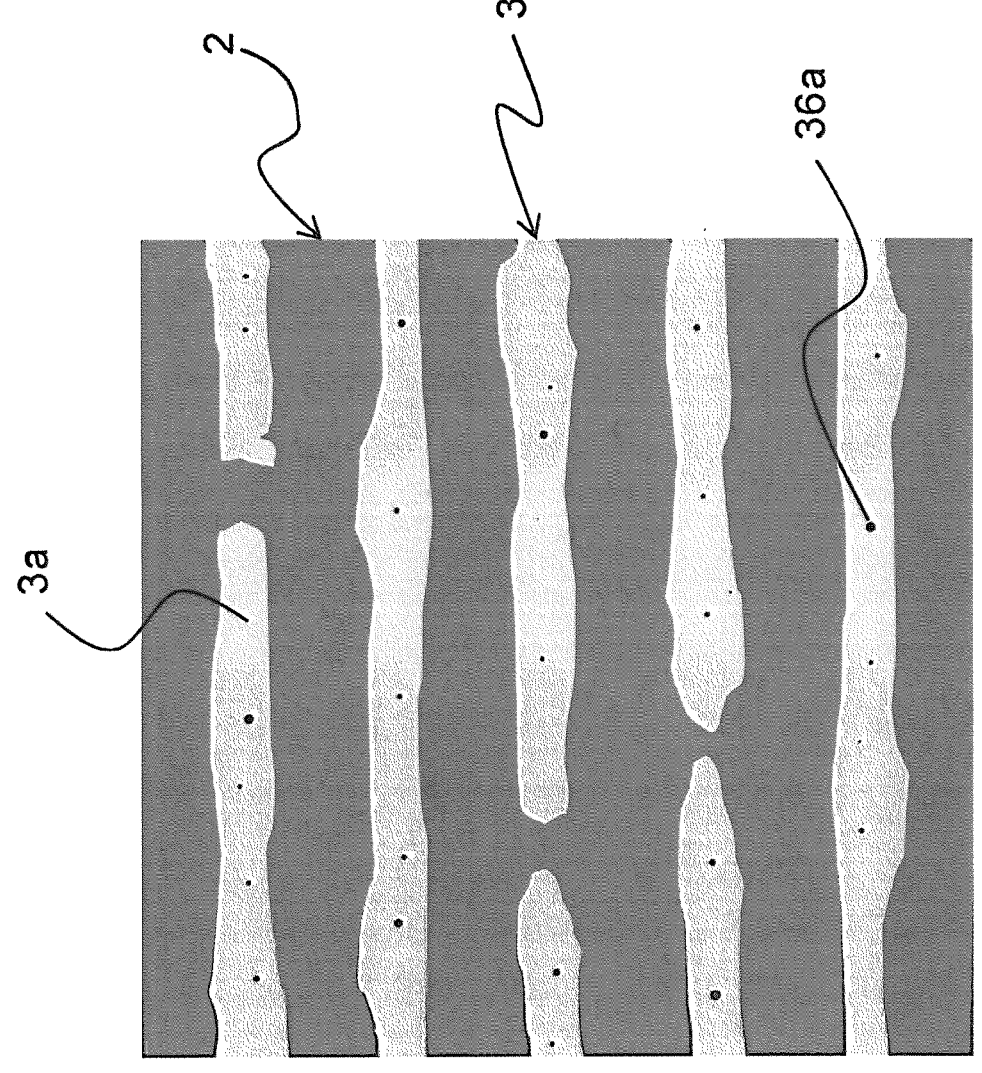
FIG. 2 is a partially enlarged photograph of a multilayer cross section of dielectric layers and internal electrode layers shown in FIG. 1.
Figure 2:
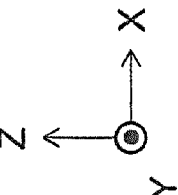

As shown in FIG. 2, each ceramic layer 2, which is an insulating layer, has some variation in thickness along the Z-axis direction, but is substantially continuous along the X-axis and the Y-axis. Each internal electrode layer 3, which is a conductive layer, may include an electrode discontinuous portion 3b along the X-axis or the Y-axis. Within the observation range of FIG. 2, which is a cross-sectional photograph, the internal electrode layers 3 may be composed of internal electrode portions 3a, which appear to be discontinuous along the X-axis or the Y-axis.

Note that, the internal electrode portions 3a, which appear to be discontinuous along the X-axis or the Y-axis, are actually connected in other cross sections of the ceramic body 10 shown in FIG. 1 and do not result in poor connection, but the fewer the electrode discontinuous portions 3b, the higher the coverage of the electrode layers 3 with respect to the ceramic layers 2 and the better the characteristics such as capacitance. In general, the thinner the internal electrode layers 3 and the ceramic layers 2, the more likely the electrode discontinuous portions 3b and the lower the electrode coverage tends to decrease.

Figure 3:
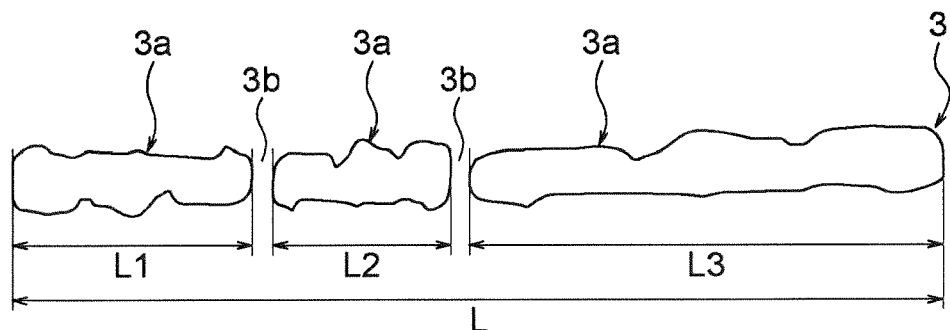
FIG. 3 is an enlarged schematic view of a part of the internal electrode layers shown in FIG. 2.
Figure 3:
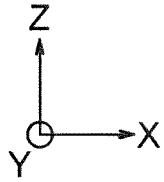

The electrode coverage can be measured by the method shown in FIG. 3, for example. In the cross-sectional photograph as shown in FIG. 2, an enlarged schematic diagram of one internal electrode layer 3 is shown in FIG. 3. In FIG. 3, as an example, it is assumed that the internal electrode layer 3 with a length L includes two electrode discontinuous portions 3b in the X-axis or Y-axis direction within the observation range of the cross-sectional photograph. In this case, the electrode coverage is obtained by dividing the sum of the lengths L1, L2, and L3 of the electrode portions 3a along the X-axis or Y-axis direction by the entire length L of the internal electrode layer 3. The coverage can also be represented by %. The coverage may also be obtained as an average value calculated for a predetermined number (e.g., 10 or more) of internal electrode layers 3 within the observation range of the cross-sectional photograph.

In the present embodiment, it is possible to obtain an electrode coverage of preferably 70% or more, more preferably 80% or more, within a predetermined cross-sectional observation range (e.g., 12 μm×8 μm) while the internal electrode layers 3 are thin. Also, in the present embodiment, the number of electrode portions 3a (number of electrode divisions) per internal electrode layer within a predetermined cross-sectional observation range (e.g., 12 μm×8 μm) is preferably 5 or less, more preferably 3 or less, and particularly preferably 2 or less.

Figure 4:
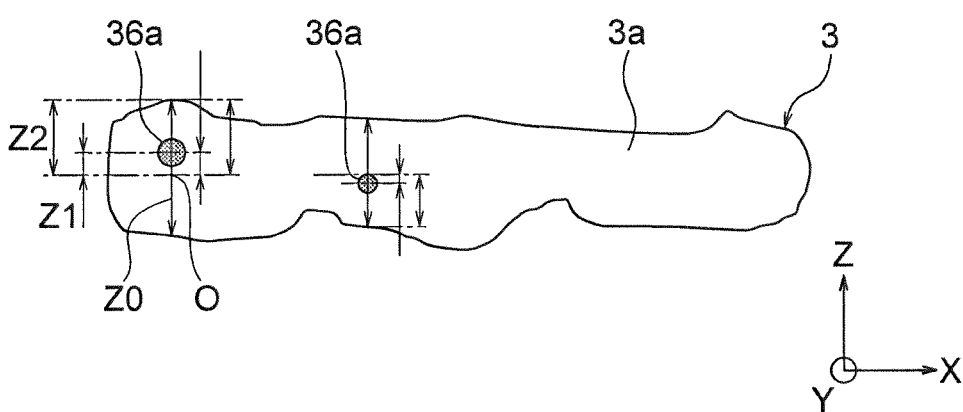
FIG. 4 is a schematic view for explaining Dsp of inner ceramic particles contained in a part of the internal electrode layer as shown in FIG. 3.

As shown in FIG. 2 and FIG. 4, ceramic particles 36a with a comparatively small particle size are present inside the electrode portions 3a of the internal electrode layers 3 in the present embodiment. In FIG. 2, the ceramic particles 36a are observed as black dots observed inside the gray electrode portions 3a. Although not necessarily clear in FIG. 2, the ceramic layers 2 are actually formed by a series of ceramic particles having comparatively large particle sizes compared to the ceramic particles 36a. In the present embodiment, the ceramic particles 36a observed inside the electrode portions 3a of the internal electrode layers 3 are also referred to as inner ceramic particles 36a for the purpose of distinguishing them from the ceramic particles of the ceramic layers 2.

In the present embodiment, the inner ceramic particles 36a are dispersed inside the internal electrode layers 3 and located near the center in the thickness direction of the internal electrode layers 3 (substantially parallel to the Z-axis direction). In the present embodiment, an index Dsp is used as an index indicating the position in the thickness direction of the inner ceramic particles 36a inside the internal electrode layers 3. The index Dsp is obtained, for example, as follows.

For example, FIG. 4 shows a schematic diagram of the electrode portion 3a of one internal electrode layer 3 extracted from a cross-sectional photograph as shown in FIG. 2. In FIG. 4, for example, focusing on one inner ceramic particle 36a, a perpendicular line passing through the center of gravity of this particle 36a and being parallel to the thickness direction of the electrode portion 3a (substantially parallel to the Z-axis direction) is drawn, and the length up to which the perpendicular line intersects with the upper and lower edges of the electrode portion 3a is defined as an electrode width Z0. Next, a midpoint position (center position) O of the electrode width Z0 is obtained, and a distance Z1 from the midpoint position O to the center of gravity position of the particle 36a is obtained. The value obtained by dividing the distance Z1 by the distance Z2 and expressing it as a percentage is defined as an index Dsp. Note that, the distance Z2 is ½ of the distance Z0.

Dsp can be calculated automatically for each ceramic particle 36a using an image processing algorithm. Also, an area S0 of each ceramic particle 36a can be calculated automatically using an image processing algorithm.

Dsp can be expressed as a number from 0 to 100, and the ceramic particle 36a with a Dsp of 0 means the ceramic particle 36a located at the midpoint position O of the perpendicular line Z0. Also, the ceramic particle 36a with a Dsp of 100 means the ceramic particle 36a located at the upper or lower edge of the electrode portion 3a that is farthest from the midpoint position O of the perpendicular line Z0. The closer Dsp is to 0, the closer the ceramic particle 36a is to the midpoint position. On the other hand, the closer Dsp is to 100, the closer the ceramic particle 36a is to the upper or lower edge of the internal electrode layer 3.

In the present embodiment, inside the internal electrode layers 3, the inner ceramic particles 36a are present in 50% or more of the total area of the inner ceramic particles 36a present within an observation range (e.g., 12 μm×8 μm) of the cross-sectional photograph within a region with a Dsp of 40 or less. Also, preferably, the inner ceramic particles 36a are present in 50% or more of the total area of the inner ceramic particles 36a present in an observation range (e.g., 12 μm×8 μm) of the cross-sectional photograph within a region with a Dsp of 30 or less.

Also preferably, the inner ceramic particles 36a are present in 99% or more of the total area of the inner ceramic particles 36a present within an observation range (e.g., 12 μm×8 μm) of the cross-sectional photograph within a region with a Dsp of 75 or less, preferably 73 or less.

For example, the following procedure is performed so as to determine whether or not the inner ceramic particles 36a are present in the internal electrode layers 3 in an area satisfying a predetermined percentage or more of the total area of the inner ceramic particles 36a within a region with a Dsp satisfying a predetermined value or less within an observation range of the cross-sectional photograph shown in FIG. 2.

Figure 5:
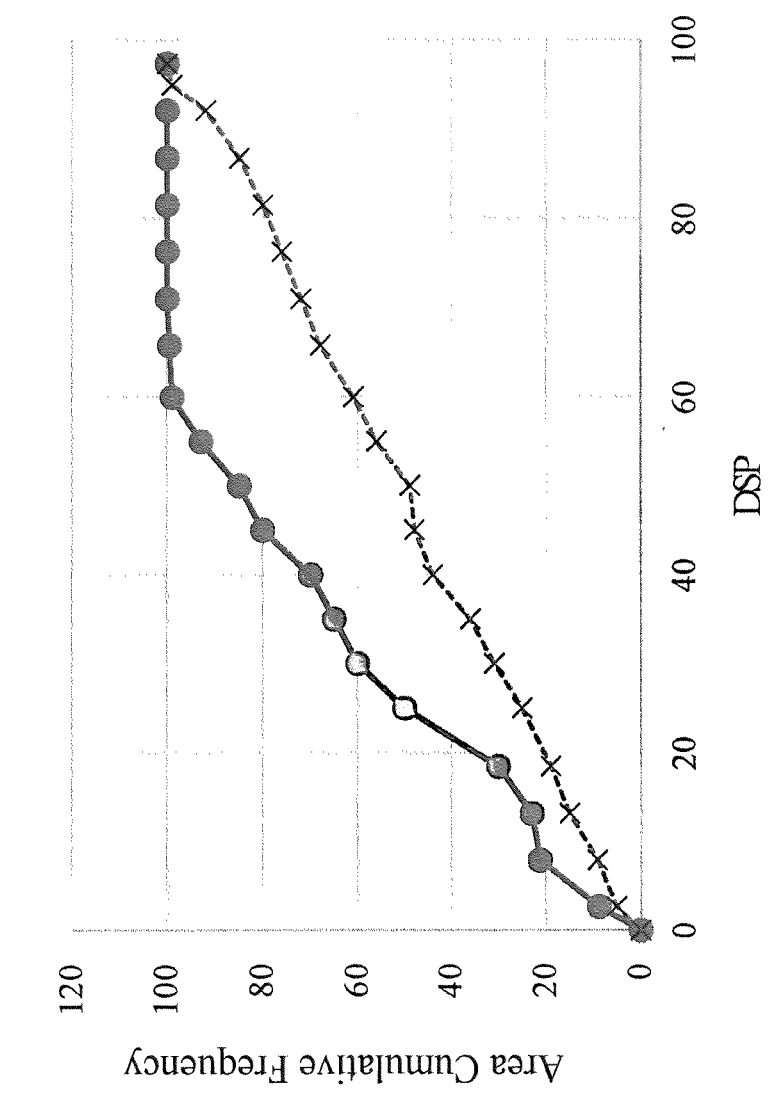
FIG. 5 is a graph showing the relation between Dsp of each inner ceramic particle shown in FIG. 2 and the area cumulative frequency of the inner ceramic particles.

FIG. 5 is a graph showing the relation between Dsp of each inner ceramic particle 36a shown in FIG. 2 and the area cumulative frequency of the inner ceramic particles, and this graph can be automatically calculated by image analysis software from, for example, an image as shown in FIG. 2. The horizontal axis represents a numerical value of Dsp, and the vertical axis represents an area cumulative frequency of the inner ceramic particles 36a within the observation range of the cross-sectional photograph. The area of the inner ceramic particles 36a is accumulated from the area of the inner ceramic particle 36a with a Dsp close to 0.

In the graph of FIG. 5, the line connecting the circular plots indicates an example of the present invention, and the cross marks indicate a comparative example of the present invention. In the example, the value of Dsp at the position of the area cumulative frequency of 50% (Dsp50) is 25, and the value of Dsp at the position of the area cumulative frequency of 99% (Dsp99) is 60.

That is, it can be said from the graph shown in FIG. 5 that, in the example, since Dsp50 is 25, half or more (50% or more by area) of the inner ceramic particles 36a present within the observation range of the cross-sectional photograph as shown in FIG. 2 are present in a region with a Dsp of 40 or less, preferably 30 or less (near the center in the thickness direction). Also, it can be said that, in the example, since Dsp99 is 60, most (99% or more by area) of the inner ceramic particles 36a present within the observation range of the cross-sectional photograph as shown in FIG. 2 are present in a region with a Dsp of 60 or less (near the center in the thickness direction).

Note that, the area cumulative frequency means a cumulative relative frequency (0 to 100) obtained by accumulating the area of each ceramic particle 36a contained in the internal electrode layers 3 within the observation range.

Next, a method of manufacturing a multilayer ceramic capacitor 1 shown in FIG. 1 and FIG. 2 is described.

Figure 6:
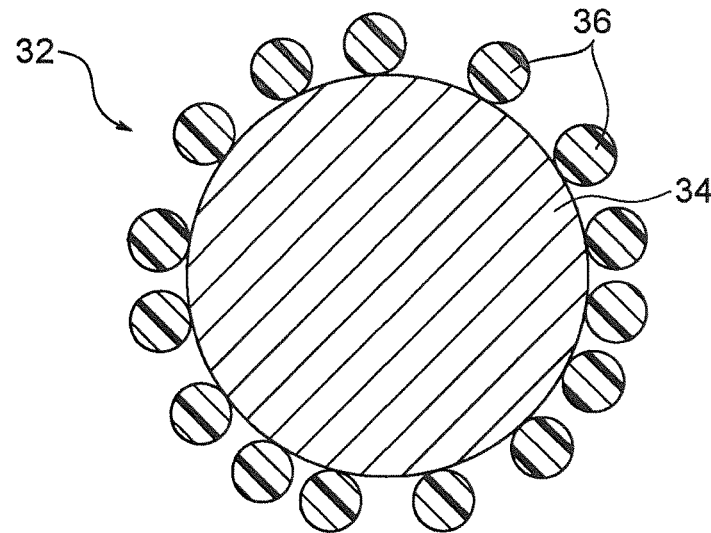
FIG. 6 is a schematic cross-sectional view of a composite particle used in a paste for forming the internal electrode layers shown in FIG. 2.

First, a ceramic green sheet containing a ceramic material for forming a ceramic body 10 is prepared. Next, a conductor paste is applied onto the ceramic green sheet to form a conductive pattern corresponding to an internal electrode layer 3. Since the conductor paste according to the present embodiment contains composite particles 32 shown in FIG. 6, for example, for the purpose of maintaining the structure of the composite particles 32, it is preferable to knead the composite particles 32 comparatively gently, and it is preferable to knead the composite particles 32 with a rotation/revolution stirrer. Note that, the details of the composite particles 32 shown in FIG. 6 are described below.

The conductor paste can be applied by various printing methods, such as screen printing, but since the conductor paste of the present embodiment contains the composite particles 32, the conductor paste is preferably applied by screen printing or gravure printing for the purpose of maintaining the structure of the composite particles 32.

A mother laminate is produced by stacking a plurality of ceramic green sheets on which no conductive pattern is formed, the ceramic green sheets on which the conductive pattern is formed, and a plurality of ceramic green sheets on which no conductive pattern is formed in this order and pressing them in the stacking direction.

The mother laminate is cut to form a plurality of green ceramic bodies. Note that, the mother laminate can be cut by dicing or press cutting. Moreover, the green ceramic bodies may be subjected to barrel polishing, etc. so as to round off their ridges and corners.

Before firing, the green chips are subjected to a binder removal treatment. As the binder removal conditions, the temperature rising rate is preferably 5 to 300° C./hour, the holding temperature is preferably 180 to 800° C., and the temperature holding time is preferably 0.5 to 24 hours. The binder removal atmosphere is air or a reducing atmosphere. The temperature rising rate during firing is not limited, but is preferably 50 to 500° C./hour, more preferably 200 to 300° C./hour.

The holding temperature during firing is preferably 1200 to 1350° C., more preferably 1220 to 1300° C., and its holding time is preferably 0.5 to 8 hours, more preferably 2 to 3 hours. The firing atmosphere is preferably a reducing atmosphere, and the atmospheric gas can be, for example, a humidified mixed gas of $N_2$ and $H_2$.

The oxygen partial pressure during firing is appropriately determined depending on the type of conductive material in the conductor paste, but when a base metal such as Ni and a Ni alloy is used as the conductive material, the oxygen partial pressure in the firing atmosphere is preferably $10^{-14}$ to $10^{-10}$ MPa. The temperature falling rate is preferably 50 to 500° C./hour.

After the firing in a reducing atmosphere, the ceramic body 10 may be annealed. The oxygen partial pressure in the annealing atmosphere may be $10^{-9}$ to $10^{-5}$ MPa, the holding temperature during annealing may be 950 to 1150° C., and the holding time may be 0 to 20 hours. The annealing atmospheric gas can be, for example, a humidified $N_2$ gas.

In the above-mentioned binder removal treatment, firing, and annealing, $N_2$ gas, mixed gas, or the like is humidified with, for example, a wetter. In this case, the water temperature is preferably about 5 to 75° C. The binder removal treatment, firing, and annealing may be performed continuously or independently.

The ceramic body 10 obtained as described above is subjected to end-surface polishing by barrel polishing, sandblasting, or the like, coated with an external-electrode paste, and fired to form external electrodes 4. Then, if necessary, a coating layer is formed on the surfaces of the external electrodes 4 by plating, etc. Note that, the external-electrode paste contains known binders and solvents in addition to external-electrode conductive particles for constituting the external-electrode conductive material after firing.

The multilayer ceramic capacitor 1 of the present embodiment manufactured in such a manner is mounted on a printed circuit board by soldering, etc. and is used in various electronic devices.

Next, the composite particles 32 are described with reference to FIG. 6 to FIG. 9.

As shown in FIG. 6, each composite particle 32 according to the present embodiment includes a conductive particle 34 and inhibitor particles 36 attached to the surface of the conductive particle 34 and having a particle size smaller than that of the conductive particle 34. The conductive particles 34 are contained in a conductive paste print pattern and become the internal electrode layers 3 shown in FIG. 1 and FIG. 2 after firing. The material of the conductive particles 34 is not limited, but is preferably at least one selected from Ni, Ni based alloys, Cu, Cu based alloys, Ag, and Ag based alloys and is more preferably Ni or Ni based alloys. Note that, each conductive particle 34 may contain various trace components, such as C, S, N, and O, in an amount of about 1 mass % or less.

In the present embodiment, the conductive particles 34 may be a plurality of conductive particles 34 made of the same material or a plurality of conductive particles 34 made of different materials.

In the present embodiment, the particle size (R) of each conductive particle 34 is preferably 20 nm or more and 300 nm or less and is more preferably 25 nm or more and 150 nm or less. In the present embodiment, even if the conductive particles 34 are made comparatively fine in such a manner, the inhibitor particles 36 are attached to the surfaces of the conductive particles 34, and the sintering start temperature can thus be shifted to the higher temperature side. Moreover, when R is in the above-mentioned range, the internal electrode layers 3 are easily thinned. From the above viewpoint, R is preferably at least smaller than $\frac{1}{5}$ of the thickness of each internal electrode layer 3.

In FIG. 2 and FIG. 4, the inhibitor particles 36 are the portions that become the ceramic particles 36a in the internal electrode layers 3 after firing. The material of the inhibitor particles 36 is not limited, but is preferably a material that has the effect of shifting the sintering start temperature of the internal electrode layers 3 to the higher temperature side, more preferably an oxide, and even more preferably an insulating material. Specific examples of the material that has the effect of shifting the sintering start temperature of the internal electrode layers 3 to the higher temperature side and is an oxide and an insulating material include at least one selected from barium titanate, calcium barium titanate, strontium barium titanate, $(Ba_{1-x}Ca_x)(Ti_{1-y}Zr_y)O_3$, silicon oxide, titanium oxide, zirconium oxide, and aluminum oxide and is preferably barium titanate or silicon oxide, more preferably barium titanate.

In the present embodiment, the inhibitor particles 36 preferably have crystallinity. This makes it possible to shift the sintering start temperature of the internal electrode layers 3 to the higher temperature side. The presence of crystallinity can be confirmed, for example, by a scanning transmission electron microscope (STEM) or an X-ray diffraction method (XRD).

In the present embodiment, the inhibitor particles 36 are smaller than the conductive particles 34. The particle size (r) of each inhibitor particle 36 is 2 nm to 30 nm, preferably 5 nm to 20 nm. When r is within the above range, the inhibitor particles are easily dispersed.

In the present embodiment, (r/R) is preferably 0.01 or more and 0.17 or less, more preferably 0.03 or more and 0.15 or less, where R is a particle size of each conductive particle 34, and r is a particle size of each inhibitor particle 36 attached to each conductive particle 34. When r/R is within the above range, the inhibitor particles 36 are less likely to fall off from each conductive particle 34.

In the present embodiment, the inhibitor particles 36 may be a plurality of inhibitor particles 36 made of the same material or a plurality of inhibitor particles 36 made of different materials.

When the inhibitor particles 36 are made of two or more different materials, the average particle size of the inhibitor particles 36 made of one material may be different from the average particle size of the inhibitor particles 36 made of another material.

Note that, the particle sizes of the conductive particles 34 and the inhibitor particles 36 according to the present embodiment and the coverage of the inhibitor particles 36 with respect to the conductive particles 34 are measured as follows.

Figure 7:
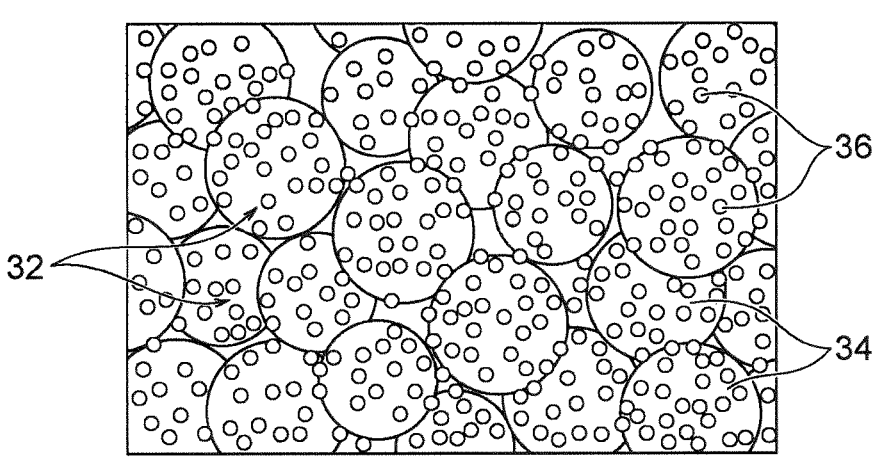
FIG. 7 is an explanatory diagram for measuring an inhibitor coverage in the composite particle.

A liquid containing the composite particles 32 is dropped onto the stage of a scanning electron microscope (SEM) or STEM and air-dried. Next, an SEM image, etc. is taken. A schematic diagram of the SEM image is shown in FIG. 7. The field of view of the SEM image, etc is not limited, but is approximately (R×8)×(R×6), where R is an average particle size of the conductive particles 34.

Figure 8:
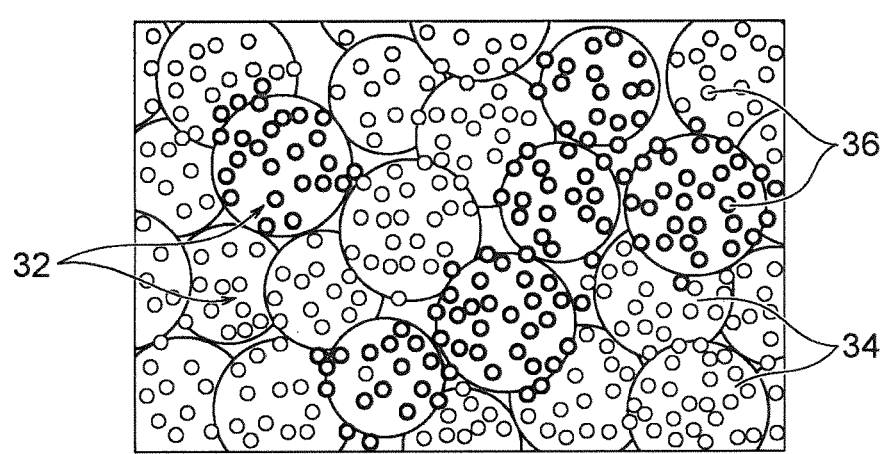
FIG. 8 is an explanatory diagram for measuring an inhibitor coverage following FIG. 7.

Next, the "conductive particles 34 with a visible outline" are selected from the SEM image, etc. In FIG. 8, the outlines of the "conductive particles 34 with a visible outline" in FIG. 7 are shown with thick lines, and the outlines of the "inhibitor particles 36 with a visible outline" attached to the "conductive particles 34 with a visible outline" are also shown with thick lines. Note that, the "conductive particles 34 with a visible outline" mean conductive particles 34 whose entire outlines are contained in the SEM image, etc and that are present at the forefront in the SEM image, etc. Thus, if even a part of the conductive particles 34 is missing, the conductive particles 34 are not the "conductive particles 34 with a visible outline". Also, if even a part of the conductive particles 34 are present behind (back) other conductive particles 34, the conductive particles 34 are not the "conductive particles 34 with a visible outline".

The circular equivalent diameter is determined for each of the "conductive particles 34 with a visible outline" and the "inhibitor particles 36 with a visible outline" attached to the "conductive particles 34 with a visible outline" confirmed by the above-mentioned method and is taken as a particle size. Then, particle sizes (R) of the conductive particles 34 and an average particle size (r) of the particles 36 are determined.

Figure 9:
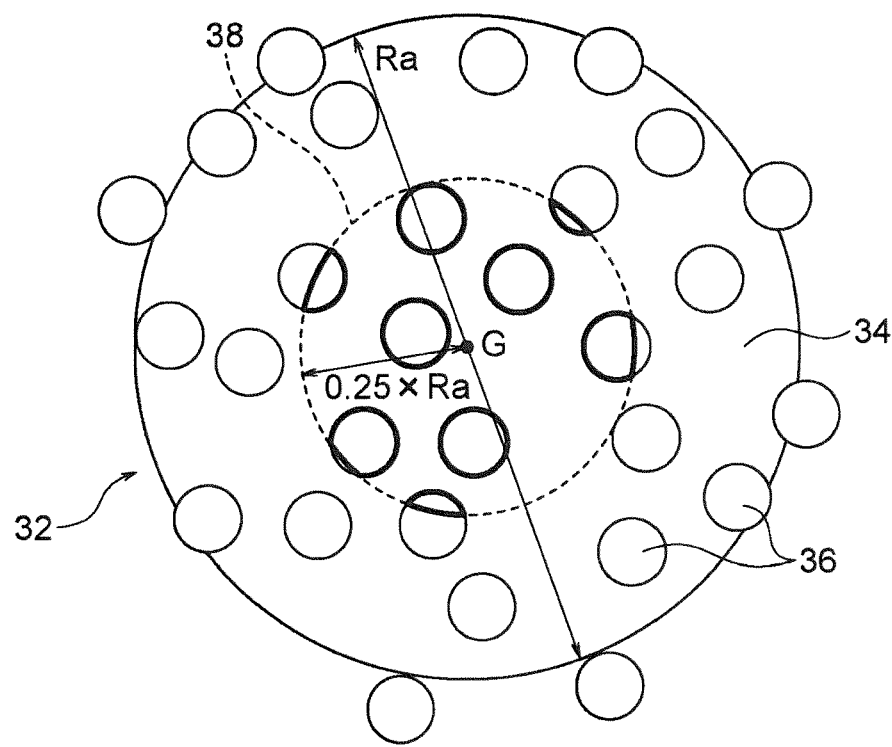
FIG. 9 is an explanatory diagram for measuring an inhibitor coverage following FIG. 8.

Moreover, as shown in FIG. 9, a center of gravity G is determined for each of the "conductive particles 34 with a visible outline", and a circle with a radius of "0.25×a particle size (Ra) of this conductive particle" is drawn from the center of gravity G and determined as a virtual circle 38. Note that, the "particle size Ra" is a particle size of each conductive particle 34, not an average particle size. The total area of the inhibitor particles 36 contained in the virtual circle 38 with respect to the area of the virtual circle 38 is determined as a coverage. The coverage is determined for all of the "conductive particles 34 with a visible outline" shown in FIG. 7 and FIG. 8, and their average value is determined as an average coverage.

In the present embodiment, the average coverage of the inhibitor particles 36 with respect to the conductive particles 34 is preferably 3% or more and 50% or less, more preferably 5% or more and 30% or less. The variation in coverage indicated by the standard deviation of coverage is preferably 0% or more and 20% or less, more preferably 0% or more and 5% or less. In the present embodiment, since the inhibitor particles 36 are attached to the conductive particles 34 by electrostatic adsorption, which is described below, aggregation of the inhibitor particles 36 can be reduced, and the variation in coverage can thus be kept low.

In the present embodiment, the ratio of the number of composite particles 32 with a coverage of 0% to the number of composite particles 32 observed, namely, the rate of composite particles 32 with a coverage of 0% is preferably 60% or less, more preferably 10% or less.

Moreover, in the present embodiment, for example, when r/R is approximately 0.07 to 0.09, the number of inhibitor particles 36 contained in the virtual circle 38 is preferably 0 or more and 20 or less, more preferably 1 or more and 15 or less. Note that, the "inhibitor particles 36 contained in the virtual circle 38" do not include inhibitor particles 36 that are partially missing.

In the present embodiment, the number of aggregation of the inhibitor particles 36 in a field of view of (R×80)×(R×60) is preferably 3 or less, more preferably 1 or less, and even more preferably 0. In the present embodiment, the content rate of the inhibitor particles 36 with respect to the conductive particles 34 is preferably 1 vol % or more and 23 vol % or less, more preferably 2 vol % or more and 15 vol % or less.

Next, a method of manufacturing composite particles 32 shown in FIG. 6 is described.

First, in the present embodiment, conductive particles 34 and inhibitor particles 36 are prepared, and the inhibitor particles 36 are attached to the surfaces of the conductive particles 34 to manufacture composite particles 32 shown in FIG. 6. The method of attaching the inhibitor particles 36 to the surfaces of the conductive particles 34 is not limited. For example, the inhibitor particles 36 may be attached to the surfaces of the conductive particles 34 by electrostatic adsorption, the inhibitor particles 36 may be attached to the surfaces of the conductive particles 34 by a mechanochemical method, the inhibitor particles 36 may be attached to the surfaces of the conductive particles 34 by a method of synthesizing and precipitating the inhibitor particles 36 on the surfaces of the conductive particles 34, or the inhibitor particles 36 may be attached to the surfaces of the conductive particles 34 with an organic material such as a resin.

In the present embodiment, the inhibitor particles 36 are preferably attached to the surfaces of the conductive particles 34 by electrostatic adsorption. This is because electrostatic adsorption makes it possible to attach the inhibitor particles 36 to the surfaces of the conductive particles 34 with low energy. Moreover, electrostatic adsorption makes it possible to adsorb the inhibitor particles 36 to the conductive particles 34 in a state close to monodispersion.

Moreover, in the case of electrostatic adsorption, a "highly crystalline material", a "highly heat-resistant material", and/or a "material nearly spherical", which are separately synthesized, can be used as the inhibitor particles 36, and the effect of the inhibitor particles 36 as an inhibitor can thus be maximized. Note that, the closer the inhibitor particles 36 are to a sphere, the smaller the specific surface area is (a perfect sphere is the smallest) and the smaller surface free energy is, which tends to increase the sintering start temperature.

Moreover, in the case of electrostatic adsorption, it is possible to reduce aggregation of the inhibitor particles 36. The aggregation of the inhibitor particles 36 causes a decrease in the number of inhibitor particles 36 that effectively function as an inhibitor and may become a starting point for electrode discontinuity.

Moreover, since the thickness of electrostatic adsorption can be changed by changing the particle sizes of the inhibitor particles 36, it is easy to control the adsorption thickness of the inhibitor (inhibitor particles 36) on the surfaces of the conductive particles 34. Moreover, in the case of electrostatic adsorption, since the conductive particles 34 and the inhibitor particles 36 are charged with opposite charges and thereafter adsorbed, there is an advantage that it is easy to control the amount of the inhibitor particles 36 attached to the conductive particles 34.

For the above-mentioned reasons, the effect of shifting the sintering start temperature of the composite particles 32 to the higher temperature side can be further enhanced by attaching the inhibitor particles 36 to the surfaces of the conductive particles 34 by electrostatic adsorption.

The oxide nanoparticles used as the inhibitor particles 36 have hydroxyl groups on the outermost surfaces and are thus basically highly hydrophilic and favorably disperse in water and highly polar solvents, such as alcohols and glycols. Although it depends on the manufacturing method and dispersion method, oxide nanoparticles often have a negative surface charge and can be used for compounding. A small amount of additive may be added to stabilize the dispersion.

Although it depends on the manufacturing method, the nickel powder used as the conductive particles 34 has a very weak positive or negative charge. A polymer electrolyte such as polydiallyldimethylammonium chloride (PDDA) and polyethyleneimine (PEI) is used and changed to a strong positive charge and can thus be composited with the negative oxide nanoparticles (inhibitor particles 36).

When $BaTiO_3$ is used as the inhibitor particles 36, they are compounded, for example, by the following method. First, Ni particles (conductive particles 34) whose surfaces are positively charged are put into an organic solvent to prepare a "dispersion liquid containing Ni particles whose surfaces are positively charged".

Moreover, a "dispersion liquid containing $BaTiO_3$ whose surfaces are negatively charged" is also prepared. The reason for using an organic solvent is that if the solvent is water, the surface ions of $BaTiO_3$ dissolve into the water. Note that, alcohols, glycols, ketones, etc. can be used as the solvent for the $BaTiO_3$ solution.

The "dispersion liquid containing Ni particles whose surfaces are positively charged" and the "dispersion liquid containing $BaTiO_3$ particles whose surfaces are negatively charged" are mixed, and the $BaTiO_3$ particles are adsorbed onto the Ni particles by electrostatic adsorption to obtain composite particles 32.

The internal electrode layers 3 of the multilayer ceramic capacitor 1 according to the present embodiment can be formed, for example, from a conductor paste containing the composite particles 32. Since the composite particles 32 are fine, the requirement for thinning the multilayer ceramic capacitor 1 can be satisfied.

Moreover, the inhibitor particles 36 have the effect of shifting the sintering start temperature of the composite particles 32 to the higher temperature side, and the composite particles 32 are configured such that the inhibitor particles 36 are attached to the surfaces of the conductive particles 34. According to the conductor paste containing the composite particles 32 of the present embodiment, the sintering start temperature of the composite particles 32 can be efficiently shifted to the higher temperature side and can be brought closer to the sintering start temperature of the ceramic layers 2. As a result, it is possible to prevent cracks of the ceramic layer 2 caused by the difference in thermal contraction behavior between the internal electrode layers 3 and the ceramic layers 2 and to prevent electrode discontinuity of the internal electrode layers 3.

Moreover, as described above, according to the composite particle 32 of the present embodiment, since the sintering start temperature of the internal electrode layers 3 can be efficiently shifted to the higher temperature side, the amount of the inhibitor can be reduced compared to the conventional conductor paste. This makes it possible to reduce the influence of the inhibitor on the ceramic layers 2.

Moreover, since the composite particles 32 according to the present embodiment is used, as shown in FIG. 2, for example, the ceramic particles 36a made of the inhibitor particles 36 after firing are often located near the center in the thickness direction inside the internal electrode layers 3, and the area percentage of the ceramic particles 36a in a region with a Dsp of a predetermined value or less becomes a predetermined value or more.

In the present embodiment, half or more (50% or more by area) of the inner ceramic particles 36a present within the observation range of the cross-sectional photograph as shown in FIG. 2 are present in a region with a Dsp of 40 or less, preferably 30 or less (near the center in the thickness direction). In the multilayer ceramic capacitor 1 including the internal electrode layers 3 configured as described above, it is possible to satisfy the thinning and high continuity of the internal electrode layers 3 at the same time. Moreover, at the same time as the thinning of the internal electrode layers 3, the thinning of the ceramic layers 2 (e.g., dielectric layers) laminated so as to be sandwiched between a pair of internal electrode layers 3 are also achieved, and the variation in the thickness of these layers is also reduced.

In the present embodiment, most (99% or more by area) of the inner ceramic particles 36a present within the observation range of the cross-sectional photograph as shown in FIG. 2 are present in a region with a Dsp of 75 or less, preferably 73 or less. In the multilayer ceramic capacitor 1 including the internal electrode layers 3 configured as described above, it is possible to satisfy the thinning and high continuity of the internal electrode layers 3 at the same time. Moreover, at the same time as the thinning of the internal electrode layers 3, the thinning of the ceramic layers 2 (e.g., dielectric layers) laminated so as to be sandwiched between a pair of internal electrode layers 3 are also achieved, and the variation in the thickness of these layers is also reduced.

The ratio of the total area of the inner ceramic particles 36a to the total area of the internal electrode layers present within the observation range is preferably 2.5% or less, more preferably 2% or less. According to the multilayer ceramic capacitor 1 including the internal electrode layers 3 configured as described above, the coverage of the internal electrode layers 3 with respect to the ceramic layers 2 is improved, and the continuity of the internal electrode layers 3 is further improved.

Moreover, in the present embodiment, the inner ceramic particles 36a present within the observation range have a maximum particle size of 69 nm or less, preferably 63 nm or less. The fact that the maximum particle size of the inner ceramic particles 36a is a predetermined value or less indicates that aggregation of the inhibitor particles (e.g., the inhibitor particles 36 shown in FIG. 6) having fine particle sizes in the internal-electrode-layer paste film is reduced. As a result of firing the internal-electrode-layer paste film while the aggregation of the inhibitor particles 36 is reduced, abnormal grain growth of the conductive particles 34 shown in FIG. 6 in the paste film is reduced. This contributes to the thinning and thickness uniformity of the internal electrode layers 3 shown in FIG. 2 and further improves the continuity of the internal electrode layers 3.

Moreover, the number of inner ceramic particles 36a per 50 $\mu m^2$ area of the internal electrode layers 3 present in the observation range of the cross-sectional photograph, for example, as shown in FIG. 2 is 185 or less, preferably 170 or less, and is in the range of, for example, 55 to 166. Since the number of inner ceramic particles 36a is controlled, the internal electrode layers 3 are thinned, the coverage of the internal electrode layers 3 with respect to the ceramic layers 2 is improved, and the continuity of the internal electrode layers 3 is further improved.

Note that, the present invention is not limited to the above-described embodiment and may variously be modified within the scope of the present invention.

For example, the electronic component of the present embodiment is not limited to a multilayer ceramic capacitor and can be applied to other electronic components including all electronic components in which ceramic layers are stacked via internal electrode layers, such as bandpass filters, inductors, multilayer three-terminal filters, piezoelectric elements, PTC thermistors, NTC thermistors, and varistors.

The internal electrode layer 3 of the present embodiment may be obtained by firing a combination of conductive particles and an inhibitor having a structure other than the composite particles 32. The material of the conductive particles is not limited and can be Ni, a Ni based alloy, Cu, a Cu based alloy, or the like.

The internal electrode layers 3 may include ceramic particles 36a that are not derived from the inhibitor particles 36. The ceramic particles 36a that are not derived from the inhibitor particles 36 may be derived from particles that are contained in the conductor paste in a different form, rather than as a part of the composite particles 32. The material of the particles that are not derived from the inhibitor particles 36 is not limited, but is preferably the same as the material of any of the compositions that constitute the ceramic layers 2 for the purpose of reducing the influence on the composition of the ceramic layers 2.

Moreover, when the external electrodes 4 are formed, instead of forming them by firing a paste, the external electrodes 4 may be formed from a resin containing the composite particles 32. That is, the external electrodes 4 may be resin electrodes containing the composite particles 32.

EXAMPLES

Hereinafter, the present invention is described with reference to more detailed examples, but the present invention is not limited to these examples.

Example 1

400 ppm of a polymer electrolyte polyethyleneimine (PEI) was prepared with respect to the weight of nickel in an ethanol dispersion liquid of a nickel powder with D50: 100 nm (initial zeta potential: +8 mV) and dissolved in ethanol. The zeta potential of nickel after dissolution was measured (Malvern Zetasizer Nano) and found to be +30 mV, confirming that the nickel surface had a negative potential due to the PEI.

Next, an ethanol dispersion liquid (D50: 10 nm) of barium titanate (inhibitor particles) was prepared as oxide nanoparticles. The zeta potential of the barium titanate dispersion liquid was measured using the same device as above and found to be −20 mV. This confirmed that the zeta potential of the nickel surface was positive, and that the zeta potential of the untreated barium titanate surface was negative.

Next, the above two types of dispersion liquid were mixed, dispersed for 10 minutes using an ultrasonic homogenizer, and then dried at 100° C. for 1 hour. The composite powder obtained by drying was mixed with a solvent (terpineol) and a binder (ethyl cellulose) to complete a paste containing composite particles. At this time, the weight of barium titanate was 5 parts by weight (5 PHP) with respect to 100 parts by weight of nickel particles (conductive particles). Note that, the volume percentage of barium titanate was 6.9 vol %.

The conductor paste obtained in such a manner had 45 parts by mass of composite particles, 3 parts by mass of ethyl cellulose, and 52 parts by mass of the solvent, with respect to 100 parts by mass of the entire paste.

Note that, composite particles different from those contained in the conductive paste were put into ethanol at a rate of 0.5 mass % and mixed with a vortex mixer for 1 minute. The mixture was left to stand for 1 to 2 hours to allow the composite particles to settle. The supernatant was removed by decantation, and ethanol was added again and mixed. The obtained liquid containing the composite particles was dropped onto an SEM stage, air-dried, and observed with an SEM. The coverage of the inhibitor particles with respect to the conductive particles was measured. The results are shown in Table 1. The average of inhibitor coverage was 30%.

Next, the conductor paste was applied onto ceramic green sheets mainly composed of $BaTiO_3$ to form a conductive pattern corresponding to the internal electrode layers 3. A mother laminate was produced by stacking a plurality of ceramic green sheets with no conductive pattern, a ceramic green sheet with the conductive pattern, and a plurality of ceramic green sheets with no conductive pattern in this order and pressing them in the stacking direction.

The mother laminate was cut to produce a plurality of pre-fired ceramic bodies (green chips). Next, the obtained green chips were subjected to a binder removal treatment, firing, and annealing under the following conditions to obtain multilayer ceramic fired bodies (ceramic bodies).

As the binder removal treatment conditions, the temperature rising rate was 25° C./hour, the holding temperature was 500° C., the temperature holding time was 8 hours, and the atmosphere was a humidified $N_2$+$H_2$ mixed gas.

As the firing conditions, the temperature rising rate was 200° C./hour, the holding temperature was 1200 to 1350° C., and the holding time was 1 hour. The temperature drop rate was 200° C./hour. The atmospheric gas was a humidified $N_2$+$H_2$ mixed gas, and the oxygen partial pressure was set to $10^{-12}$ MPa.

As the annealing conditions, the temperature rising rate was 200° C./hour, the holding temperature was 1000° C., the temperature holding time was 2 hours, the temperature drop rate was 200° C./hour, and the atmospheric gas was a humidified $N_2$ gas (oxygen partial pressure: $10^{-7}$ MPa).

Note that, a wetter was used to wet the atmospheric gases during firing and annealing.

Next, the end surfaces of the obtained ceramic bodies were polished by sandblasting, and Cu was thereafter applied as external electrodes to obtain multilayer ceramic capacitor samples as shown in FIG. 1. The size of the obtained capacitor samples was 1.0 mm×0.5 mm×0.5 mm.

The obtained capacitor samples were cut in a cross section parallel to the Z-axis, and the cross section was observed by an SEM. The observation range of the cross section was 8

μm×12 μm or more, and 10 or more internal electrode layers 3 were observed in this range. For example, the cross section as shown in FIG. 2 was subjected to image processing, and Dsp of at least 50 or more inner ceramic particles 36a located inside each of the internal electrode layers 3 was thereby measured by the above-mentioned method shown in FIG. 4. In addition, the areas of the inner ceramic particles 36a whose Dsp was measured were measured in association with the values of Dsp and cumulatively added, and a relation between the ratio to the total area of all the observed inner ceramic particles 36a (area cumulative frequency) and Dsp was obtained. The data obtained by graphing this relation is shown by the line connecting the circular dots in FIG. 5.

Dsp50 and Dsp99 were obtained from the graph shown by the line connecting the circular dots in FIG. 5 or from the original data of the graph. The results are shown in Table 1. As shown in Table 1, in Example 1, Dsp50 was 25, and Dsp99 was 60. Note that, as described above, Dsp50 is the value of Dsp at the position where the area cumulative frequency is 50%, and Dsp99 is the value of Dsp at the position where the area cumulative frequency is 99%.

Moreover, image processing was performed on the cross section as shown in FIG. 2 so as to detect the inner ceramic particle with the maximum particle size and calculate its area among at least 50 or more inner ceramic particles 36a located inside each of the internal electrode layers 3. The results are shown in Table 1. Moreover, the number of inner ceramic particles 36a per 50 μm² area of the internal electrode layers 3 present within the observation range of, for example, the cross-sectional photograph shown in FIG. 2 was calculated. The results are shown in the columns of the number of ceramic particles in Table 1.

Moreover, within the observation range of the cross section as shown in FIG. 2, the average value and the variation σ of the thicknesses of the dielectric layers 2 and the average value and the variation σ of the thicknesses of the internal electrode layers 3 were measured by image processing. The results are shown in Table 2.

Also, the electrode coverage and the number of electrode divisions of the internal electrode layers 3 and the area percentage of ceramic particles were measured and obtained from the observation of the cross section as shown in FIG. 2. As described above, the electrode coverage was obtained by the method shown in FIG. 3. The number of electrode divisions was calculated by dividing the total number of observed electrode portions 3a by the total number of internal electrode layers 3 in a cross-sectional SEM image, for example, where 10 or more internal electrode layers 3 were observed.

The area percentage of ceramic particles was obtained by calculating a ratio of the total area occupied by the ceramic particles 36a to the total area occupied by the electrode portions 3a in a cross-sectional SEM image, for example, where 10 or more internal electrode layers were observed, and this was taken as an area percentage. The results are shown in Table 2.

Examples 2 to 6

Capacitor samples were produced in the same manner as in Example 1, except that the weight of barium titanate with respect to 100 parts by weight of nickel particles in the conductor paste was 7 parts by weight (7 PHP), 9 PHP, 11 PHP, 13 PHP, or 15 PHP. The inhibitor coverage of composite particles used in each of Examples 2 to 6 was measured in the same manner as in Example 1. The results are shown in Table 1.

Moreover, the Dsp50, Dsp99, maximum size of ceramic particles, number of ceramic particles, average dielectric thickness and its variation σ, average thickness of internal electrode layers (electrode thickness) and its variation σ, electrode coverage, number of electrode divisions, and area percentage of ceramic particles for the capacitor samples according to each Example were determined in the same manner as in Example 1. The results are shown in Table 1 or Table 2.

Comparative Example 1

Capacitor samples were produced in the same manner as in Example 1, except that instead of preparing composite particles, nickel particles (conductive particles) and barium titanate (inhibitor particles) were prepared separately and mixed and dispersed with a solvent (terpineol) and a binder (ethyl cellulose) to prepare a conductor paste. The inhibitor coverage of the inhibitor particles with respect to the surfaces of the conductive particles in the conductor paste used in Comparative Example 1 was measured in the same manner as in Example 1. The results are shown in Table 1.

Moreover, the Dsp50, Dsp99, maximum size of ceramic particles, number of ceramic particles, average dielectric thickness and its variation σ, average thickness of internal electrode layers (electrode thickness) and its variation σ, electrode coverage, number of electrode divisions, and area percentage of ceramic particles for the capacitor samples according to Comparative Example 1 were determined in the same manner as in Example 1. The results are shown in Table 1 or Table 2.

Comparative Examples 2 to 6

Capacitor samples were produced in the same manner as in Comparative Example 1, except that instead of preparing composite particles, the weight of barium titanate with respect to 100 parts by weight of nickel particles in the conductor paste was 7 parts by weight (7 PHP), 9 PHP, 11 PHP, 13 PHP, or 15 PHP. The inhibitor coverage of the inhibitor particles with respect to the surfaces of the conductive particles in the conductor paste used in each of Comparative Examples 2 to 6 was measured in the same manner as in Comparative Example 1. The results are shown in Table 1.

Moreover, the Dsp50, Dsp99, maximum size of ceramic particles, number of ceramic particles, average dielectric thickness and its variation σ, average thickness of internal electrode layers (electrode thickness) and its variation σ, electrode coverage, number of electrode divisions, and area percentage of ceramic particles for the capacitor samples according to each of Comparative Examples were determined in the same manner as in Comparative Example 1. The results are shown in Table 1 or Table 2.

Evaluation 1

In comparison with Comparative Examples 1 to 6, it was confirmed that in Examples 1 to 6, the electrode continuity is excellent, the electrode thickness variation σ of the internal electrode layers and the dielectric thickness variation σ of the dielectric layers are small, and the thinning are excellent. In addition, it was confirmed from the results shown in Table 1 and Table 2 that when Dsp50 is 40 or less, preferably 30 or less, the electrode coverage is improved, the number of electrode divisions is small, the electrode continuity is improved, the thickness variation σ is small, and the thinning is excellent. In addition, it was confirmed that when Dsp99 is 80 or less, preferably 73 or less, the electrode coverage is improved, the number of electrode divisions is small, the electrode continuity is improved, the thickness variation σ is small, and the thinning is excellent.

Moreover, it was confirmed that when the maximum particle size of the inner ceramic particles is 69 nm or less, preferably 63 nm or less, the electrode continuity of the internal electrode layers is excellent, and the electrode thickness variation σ of the internal electrode layers and the dielectric thickness variation σ of the dielectric layers are small.

Moreover, it was confirmed that when the number of inner ceramic particles per area 50 μm² of the internal electrode layers is 185 or less, preferably 170 or less, and is within the range of, for example, 55 to 166, the electrode continuity of the internal electrode layers is excellent, and the electrode thickness variation σ of the internal electrode layers and the dielectric thickness variation σ of the dielectric layers are small.

Moreover, it was confirmed that when the rate of the total area of the inner ceramic particles is 2.5% or less, preferably 2% or less, the electrode continuity of the internal electrode layers is excellent, and the electrode thickness variation σ of the internal electrode layers and the dielectric thickness variation σ of the dielectric layers are small.

TABLE 1

| | Mixing Process of Inhibitor | Charged Amount of Inhibitor PHP | Charged Amount of Inhibitor vol % | Inhibitor Coverage on Surfaces of Conductive Particles % | Dsp50 | Dsp99 | Maximum Particle Size of Ceramic Particles nm | Number of Ceramic Particles number/ 50 μm² |
|---|---|---|---|---|---|---|---|---|
| Ex. 1 | composite particles | 5 | 6.9 | 30 | 25 | 60 | 45 | 55 |
| Ex. 2 | composite particles | 7 | 9.4 | 40 | 28 | 70 | 52 | 110 |
| Ex. 3 | composite particles | 9 | 11.7 | 46 | 30 | 73 | 63 | 166 |
| Ex. 4 | composite particles | 11 | 14.0 | 45 | 37 | 78 | 67 | 175 |
| Ex. 5 | composite particles | 13 | 16.1 | 46 | 38 | 79 | 68 | 180 |
| Ex. 6 | composite particles | 15 | 18.2 | 45 | 40 | 80 | 69 | 185 |
| Comp. Ex. 1 | dispersion system | 5 | 6.9 | 2 | 49 | 95 | 66 | 172 |
| Comp. Ex. 2 | dispersion system | 7 | 9.4 | 3 | 53 | 93 | 68 | 176 |
| Comp. Ex. 3 | dispersion system | 9 | 11.7 | 2 | 54 | 90 | 69 | 175 |
| Comp. Ex. 4 | dispersion system | 11 | 14.0 | 4 | 56 | 88 | 66 | 177 |
| Comp. Ex. 5 | dispersion system | 13 | 16.1 | 3 | 58 | 78 | 68 | 177 |
| Comp. Ex. 6 | dispersion system | 15 | 18.2 | 2 | 60 | 76 | 69 | 170 |

TABLE 2

| | Thickness Evaluation for Fired Electrodes and Dielectric | | | | | | |
|---|---|---|---|---|---|---|---|
| | Average | | Average | | Electrode Continuity | | Area |
| | Value of Dielectric Thickness μm | Dielectric Thickness σ μm | Value of Electrode Thickness μm | Electrode Thickness σ μm | Electrode Coverage % | Number of Electrode Divisions — | Percentage of Ceramic Particles % |
| Ex. 1 | 0.451 | 0.033 | 0.467 | 0.090 | 95 | 1.8 | 1.6 |
| Ex. 2 | 0.450 | 0.035 | 0.465 | 0.095 | 90 | 1.6 | 1.8 |
| Ex. 3 | 0.447 | 0.034 | 0.464 | 0.099 | 83 | 1.7 | 2.0 |
| Ex. 4 | 0.460 | 0.053 | 0.400 | 0.128 | 75 | 2.8 | 2.1 |
| Ex. 5 | 0.477 | 0.055 | 0.357 | 0.189 | 74 | 4.1 | 2.3 |
| Ex. 6 | 0.480 | 0.063 | 0.298 | 0.222 | 73 | 4.6 | 2.5 |
| Comp. Ex. 1 | 0.454 | 0.067 | 0.287 | 0.267 | 56 | 4.1 | 1.0 |
| Comp. Ex. 2 | 0.467 | 0.072 | 0.255 | 0.288 | 58 | 4.8 | 1.2 |
| Comp. Ex. 3 | 0.485 | 0.073 | 0.297 | 0.261 | 58 | 5.5 | 1.4 |
| Comp. Ex. 4 | 0.472 | 0.079 | 0.283 | 0.243 | 60 | 4.9 | 1.6 |
| Comp. Ex. 5 | 0.466 | 0.088 | 0.254 | 0.249 | 60 | 5.2 | 1.8 |
| Comp. Ex. 6 | 0.495 | 0.095 | 0.235 | 0.235 | 58 | 5.0 | 2.0 |

REFERENCE NUMERALS

1 . . . multilayer ceramic capacitor
2 . . . ceramic layer (dielectric layer)
3 . . . internal electrode layer
3a . . . electrode portion
3b . . . electrode discontinuous portion
32 . . . composite particle
34 . . . conductive particle
36 . . . inhibitor particle
36a . . . inner ceramic particle
38 . . . virtual circle
4 . . . external electrode
10 . . . ceramic body

The invention claimed is:

1. A multilayer ceramic electronic component comprising ceramic layers and internal electrode layers alternately stacked,
wherein
the internal electrode layers contain a plurality of inner ceramic particles therein within an observation range of a cross section intersecting the internal electrode layers, and
the inner ceramic particles are present in 50% or more of a total area of the inner ceramic particles present within a region with a Dsp of 40 or less inside the internal electrode layers, where
Dsp is an index indicating a relative position of the inner ceramic particles in the inner electrode layers with respect to a central position in a thickness direction of the inner electrode layers, the index being expressed by a number from 0 to 100, each number corresponding to a position from the central position to an edge position.

2. A multilayer ceramic electronic component comprising ceramic layers and internal electrode layers alternately stacked, wherein
the internal electrode layers contain a plurality of inner ceramic particles therein within an observation range of a cross section intersecting with the internal electrode layers, and
the inner ceramic particles are present in 99% or more of a total area of the inner ceramic particles present within a region with a Dsp of 75 or less inside the internal electrode layers, where
Dsp is an index indicating a relative position of the inner ceramic particles in the inner electrode layers with respect to a central position in a thickness direction of the inner electrode layers, the index being expressed by a number from 0 to 100, each number corresponding to a position from the central position to an edge position.

3. The multilayer ceramic electronic component according to claim 1, wherein a ratio of the total area of the inner ceramic particles to a total area of the internal electrode layers present within the observation range is 2.5% or less.

4. The multilayer ceramic electronic component according to claim 1, wherein the inner ceramic particles present within the observation range have a maximum particle size of 69 nm or less.

5. The multilayer ceramic electronic component according to claim 1, wherein the number of the inner ceramic particles per 50 μm area of the internal electrode layers present within the observation range is 185 or less.

6. The multilayer ceramic electronic component according to claim 2, wherein a ratio of the total area of the inner ceramic particles to a total area of the internal electrode layers present within the observation range is 2.5% or less.

7. The multilayer ceramic electronic component according to claim 2, wherein the inner ceramic particles present within the observation range have a maximum particle size of 69 nm or less.

8. The multilayer ceramic electronic component according to claim 2, wherein the number of the inner ceramic particles per 50 $\mu m^2$ area of the internal electrode layers present within the observation range is 185 or less.

* * * * *